United States Patent
Tada et al.

(10) Patent No.: US 7,219,261 B2
(45) Date of Patent: May 15, 2007

(54) INFORMATION PROCESSING APPARATUS AND METHOD

(75) Inventors: Kenichiro Tada, Saitama (JP); Yukio Numakami, Saitama (JP); Ryunosuke Matsumura, Saitama (JP); Katunori Iha, Saitama (JP)

(73) Assignee: Pioneer Corporation, Tokyo (JP)

(*) Notice: Subject to any disclaimer, the term of this patent is extended or adjusted under 35 U.S.C. 154(b) by 501 days.

(21) Appl. No.: 10/760,365

(22) Filed: Jan. 21, 2004

(65) Prior Publication Data
US 2004/0168201 A1 Aug. 26, 2004

(30) Foreign Application Priority Data
Jan. 21, 2003 (JP) ............... 2003-012233

(51) Int. Cl.
*G06F 11/00* (2006.01)
(52) U.S. Cl. .......................................... 714/15; 714/12
(58) Field of Classification Search ................. 714/15, 714/13, 12, 11
See application file for complete search history.

(56) References Cited

U.S. PATENT DOCUMENTS

| | | | | |
|---|---|---|---|---|
| 6,611,902 B2* | 8/2003 | Kuroda et al. | ............... | 711/162 |
| 6,851,073 B1* | 2/2005 | Cabrera et al. | ............... | 714/15 |
| 6,931,522 B1* | 8/2005 | Raghavan et al. | ............. | 713/2 |
| 2003/0131041 A1* | 7/2003 | Dinker et al. | ................ | 709/104 |
| 2003/0221051 A1* | 11/2003 | Hand et al. | .................. | 711/106 |

* cited by examiner

*Primary Examiner*—Dieu-Minh Le
(74) *Attorney, Agent, or Firm*—Young & Thompson

(57) ABSTRACT

An information processing apparatus capable of running properly, with automatically executing a backup OS program or a default OS program, from an automatic judgment in a case that a current OS program does not run properly, in which a state flag is disposed in a flash ROM in order to indicate whether or not the current OS program runs properly at the previous time, and a state of the state flag is checked when the current OS program is executed, the current OS program is executed in the case that the current OS program runs properly at the previous time, and the backup OS program is executed in the case that the current OS program does not run properly at the previous time.

18 Claims, 16 Drawing Sheets

WARNING !

BACKUP PROGRAM
OR
DEFAULT PROGRAM

IS READY TO RUN

FIG. 14

INFORMATION PROCESSING APPARATUS AND METHOD

BACKGROUND OF THE INVENTION

1. Field of the Invention

The present invention relates to an information processing apparatus and an information processing method capable of performing a predetermined processing with executing one or more programs including a boot loader, an operating system, an application software and so on.

2. Description of the Related Art

At present, there is a widespread of an information communication system for transmitting/receiving information among a plurality of information processing apparatuses, each of which, such as a computer, is inter-connected to each other via a communication line, such as a network.

Such an information communication system is expanding over a television broadcasting for example. Conventionally, a broadcasting station converts a sound and a video, which constitute a television program, into a radio wave to be transmitted; on the other hand, a television that is disposed at a viewer's house receives the radio wave and just reproduces it. At present, however, in association with digitalization of television broadcastings, a technology allowing a bidirectional communication between a television at the broadcasting station and another television at the viewer's house is developed, and thereby televisions are no longer simple receivers and becoming equal to information processing apparatuses having a function for generating and transmitting information (hereinafter a television that becomes equal in its function to the information processing apparatus is referred to as a "television apparatus"). In view of this, the television broadcasting system will be a kind of visual media information communication system, in the near future.

In such a television apparatus of the visual media information communication system, a fundamental construction of the computer is integrated. That is, each television apparatus is provided with an application software for receiving and reproducing a content information transmitted from the broadcasting station, an operating system for controlling or managing the execution of the application software, and a boot loader for starting the operating system when an electrical power is supplied to the television apparatus for example.

Nevertheless, in the aforementioned visual media information communication system, not only the content information, but also programs such as the application software, the operating system and the like to be executed in each television apparatus can be distributed via the communication line. For example, in order to update the operating system that is executed in the television apparatus to a higher grade, an owner of the television apparatus can make access to the broadcasting station via the communication line of the visual media information communication system to download and install a new operating system program into the television apparatus from the broadcasting station.

Nevertheless, a trouble that the application software or the operating system that is expected to be updated properly does not run properly may arise, due to a certain cause, such as a failure in downloading or installing, a defect in the updated program, otherwise a wrong program installation and so on. If the application software does not run properly, performing the updating processing again may solve the trouble. It is difficult, however, to solve the trouble in the case that the operating system does not run properly. That is the reason why the updating processing is no longer feasible in the case that the operating system does not run properly and a program to perform the updating processing runs also on the operating system. In this case, the owner should bring the television apparatus to the service center of the maker to ask the repair, which is inconvenience and bothersome.

SUMMARY OF THE INVENTION

An object of the invention is to provide an information processing apparatus and an information processing method capable of maintaining the operation of the apparatus, by automatically executing a backup program or a default program, on the basis of an automatic judgement even in the case that a program does not run properly.

The aforementioned object is achieved by an information processing apparatus comprising: a first memory device for storing a first program including a command to execute other programs; a second memory device for storing a second program to perform a predetermined processing in accordance with the command in the first program; a third memory device for storing a backup program for the second program; a fourth memory device for storing a first state information to substantially indicate that the second program does not properly perform the predetermined processing; and a first selection device for selecting either one of the second program and the backup program, as a program to be executed in accordance with the command in the first program, on the basis of the first state information.

The aforementioned object is achieved by a computer program product in a computer-readable medium for tangibly embodying a program of instructions executable by a computer to make the computer function as an information processing apparatus, said apparatus comprising: a first memory device for storing a first program including a command to execute other programs; a second memory device for storing a second program to perform a predetermined processing in accordance with the command in the first program; a third memory device for storing a backup program for the second program; a fourth memory device for storing a first state information to substantially indicate that the second program does not properly perform the predetermined processing; and a first selection device for selecting either one of the second program and the backup program, as a program to be executed in accordance with the command in the first program, on the basis of the first state information.

The aforementioned object is achieved by an information processing method feasible with an information processing apparatus capable of processing a first program including a command to execute other programs; a second program to perform a predetermined processing in accordance with the command in the first program; a backup program for the second program; and a first state information to substantially indicate that the second program does not properly perform its predetermined processing, said method comprising: a first state information set process of setting or changing the first state information to a first content, when the first program executes or executed the second program or the backup program; a second state information set process of setting or changing the first state information to a second content, when the second program or the backup program ends or ended properly; and a selection process of selecting either one of the second program and the backup program, on the basis of the first state information, when the first program executes again the second program or the backup program.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 14 is an explanation view illustrating an example of a notice information in an information processing apparatus according to the first example of the present invention.

DETAILED DESCRIPTION OF THE PREFERRED EMBODIMENTS

The embodiments of the present invention will now be discussed, with reference to drawings.

(First Embodiment)

Figure 1:
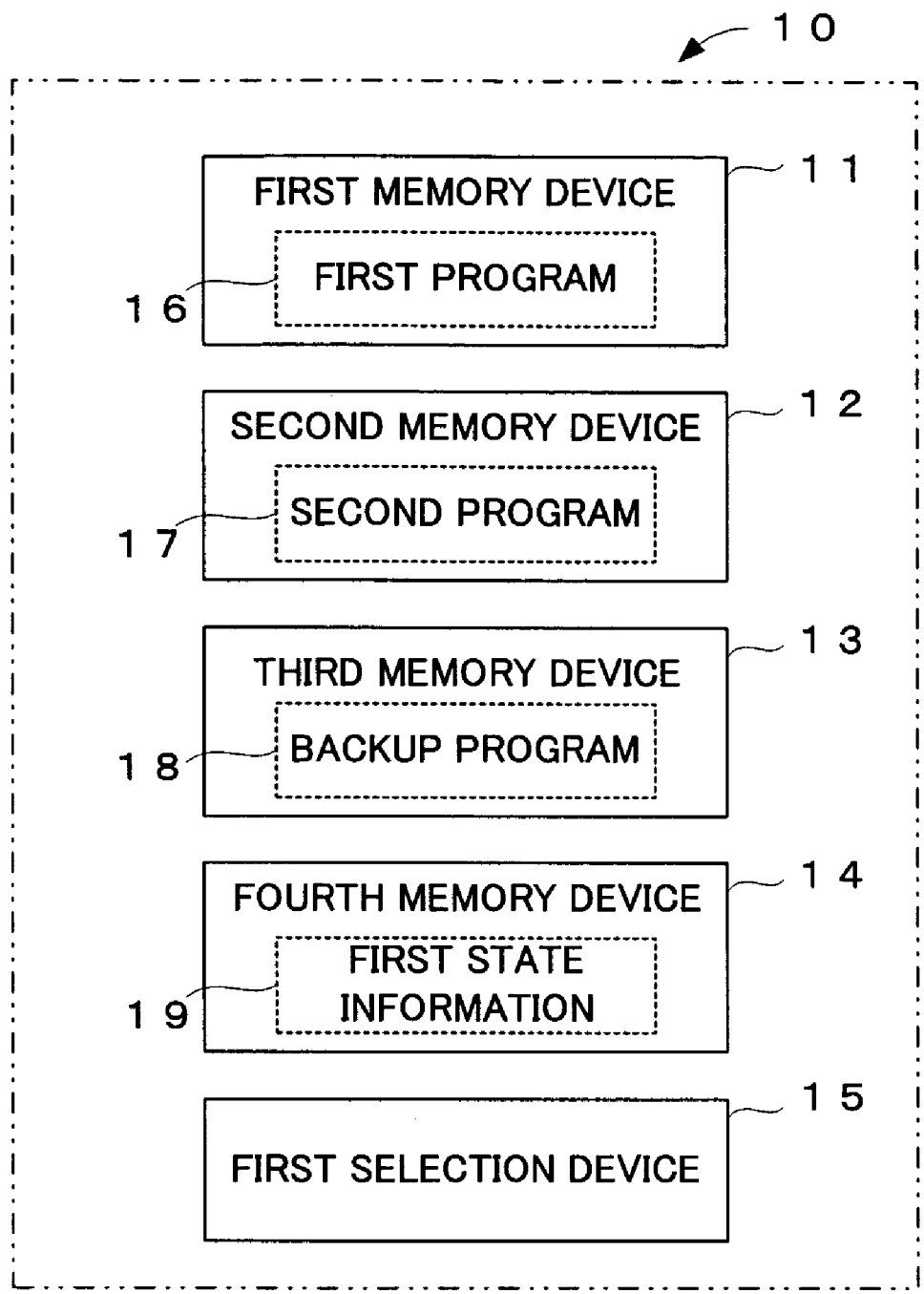
FIG. 1 is a block diagram illustrating an information processing apparatus according to a first embodiment of the present invention.

A first embodiment of the present invention will now be discussed, with reference to FIG. 1. FIG. 1 illustrates an information processing apparatus according to the first embodiment of the present invention. Incidentally, FIG. 1 tangibly illustrates components or elements constituting the information processing apparatus according to the first embodiment of the present invention for a purpose of explaining the technical concept of the present invention, nevertheless not restrictive as for size and position of each components or relationships thereof. The same goes for FIG. 2 to FIG. 4, used for explaining other embodiments.

As shown in FIG. 1, the information processing apparatus 10 according to the first embodiment of the present invention is provided with first to fourth memory devices 11, 12, 13 and 14, and a first selection device 15. The information processing apparatus 10 is typically a computer having an arithmetic processing circuit, a storage circuit and the like, but may be any device having a functional capability equal to such a computer. For example, the information processing apparatus 10 may be a television allowing a bidirectional digital communication, otherwise may be video record reproduction apparatus for receiving, recording and managing a video information, and reproducing the video information on the basis of the user's selection.

The first memory device 11 is for storing a first program 16 including a command to execute other programs. The first memory device 11 may be any record medium or storage medium capable of storing or recording a program such as a computer program or the like. Generally, there are various kinds of the record or storage medium, including a semiconductor integrated circuit, a magnetic record medium, an optical record medium, a magneto-optical record medium, a dielectric record medium and a nearfield optical record medium. The first memory device 11 may be any of such a record or storage medium. Furthermore, the first memory device 11 may be a read-only type or may be a recordable/rewritable type, regardless of volatile or non-volatile, and further regardless of fixed in the device or externally attachable or insertable. Furthermore, the first memory device 11 may be embodied in one record medium united with second to fourth record media or the like, insofar as property and applicability of each medium is common thereamong. If the property or applicability is different among record media, each record medium may be embodied in a separate record medium. Otherwise, some of record media having the common property or applicability may be embodied in the same body, and the remains may be another or other bodies. The first memory device 11 may be preferably a ROM (read only memory) for example, in view of the property or function of the first program 16 to be stored in the first memory device 11.

The first program 16 may be any program insofar as it includes a command to execute other programs. The first program 16 may be a program such as a boot loader, an operating system, and an application software for example. The boot loader is a program to be executed immediately after the power is supplied to the apparatus, for starting a program such as an operating system or the like. The first program 16 may be typically the boot loader.

The second memory device 12 is for storing a second program 17 to perform a predetermined processing in accordance with a command in the first program 16. Similarly to the first memory device 11, the second memory device 12 may be any record or storage medium capable of storing or recording a program such as a computer program. The second memory device 12 may be a recordable/rewritable record medium, such as a flash ROM or a static RAM (random access memory), in view of the property or applicability of the second program 17 to be stored in the second memory device 12.

The second program 17 is a program for performing the predetermined processing in accordance with the command in the first program 16. The content of the predetermined processing to be performed by the second program 17 is not limited. The second program 17 may be a program such as an operating system, an application software or the like. The startup of the second program 17 at least is induced by the command of the first program 16. In view of this, the first program 16 may be positioned as a primary program, which the second program 17 may be positioned as a secondary program. If the information processing apparatus 10 has a multi-functionality or extensibility, as seen in a common computer, the second program 17 may be a program intended to be rewritten or updated.

The third memory device 13, which is constructed almost the same as the second memory device 12, is for storing a backup program 18 of the second program 17.

The backup program 18 is a backup program of the second program 17, such as the second program before updated, or an old version of the second program.

The fourth memory device 14 is for storing a first state information 19 substantially indicating that the second program 17 does not properly perform the predetermined processing. The fourth memory device 14 may be any record medium capable of storing or recording the information, more specifically may be almost the same construction as the second memory device 12 or the third memory device 13. The first state information 19 stored in the fourth memory device 14 is intended to be updated in accordance with a state of the second program 17. Therefore, the fourth memory device 14 may be preferably a rewritable record medium, such as a flash ROM or RAM.

The first state information 19 is an information substantially indicating that the second memory device 17 does not properly execute the predetermined program. For example, the first state information 19 may be a binary information directly indicating whether or not the second program 17 properly performs the predetermined processing, or may be a data group indicating the number of error positions or an irrecoverable degree of the second program 17. In view of a fact that the first state information 19 becomes a basis when the first selection device 15 selects either one of the second program 17 and the backup program 18, the first state information may be preferably more simplified information, such as a flag, for a purpose of simplification or promptness of the processing. Incidentally, a case that the second program 17 does not properly perform the predetermined processing may be a case that the second program 17 fails to be updated, a case that the second program 17 has a defect, a case that a wrong program is recorded as the second program 17, and a case that the second program 17 does not have a good compatibility with the information processing apparatus 10 for some reasons. Furthermore, although a fact that the second program 17 does not properly perform the predetermined processing may be recognized by analyzing the content of the second program 17, the fact may be more simply recognized by trying an execution of the second program 17. For example, if the second program 17 is not started or not properly terminated when its execution is tried, it is recognized that the second program 17 does not properly perform the predetermined processing.

The first selection device 15 is for selecting either one of the second program 17 and the backup program 18, as a program to be executed in accordance with a command in the first program 16, on the basis of the first state information 19. The first selection device 15 may be embodied in an arithmetic processing circuit such as a CPU (Central Processing Unit) disposed in the information processing apparatus 10 for example. Alternatively, the first selection device 15 may be embodied in a command included in the first program 16.

For example, if the first state information 19 indicates a fact that the second program 17 does not properly perform the predetermined processing, the first selection device 15 recognizes it on the basis of the first state information 19 and selects the backup program 18. On the other hand, if the first state information 19 does not indicate that the second program 17 does not properly perform the predetermined processing, the first selection device 15 recognizes it on the basis of the first state information 19 and selects the second program 17. Then, the program that is selected by the first selection device 15 is executed in accordance with a command of the first program 16. As a result, if it is assumed that the backup program 18 properly performs the predetermined processing, the operation of the information processing apparatus 10 is always maintained properly. Here, if the backup program 18 is the old version of the second program 17, it may be inferior in its processing performance or the like. Nevertheless, if the second program 17 that does not properly perform the predetermined processing is executed, a serious trouble may arise in the information processing apparatus 10. According to the aforementioned construction, this serious trouble can be avoided.

Particularly, the construction according to embodiments of the present invention is effective in the case that the second program 17 is a program basically to support the operation of the information processing apparatus 10, such as an operating system or the like. The information processing apparatus 10 tends to lose the majority of its function in the case that the operating system does not properly run. Even in the case, however, if the backup program of the operating system runs, a problem at the present may be recovered. For example, during the execution of the backup program of the operating system, a debug program may be started to debug the operating system program, or a new operating system program may be re-installed via a communication network or via a recovery disk.

(Second Embodiment)

Figure 2:
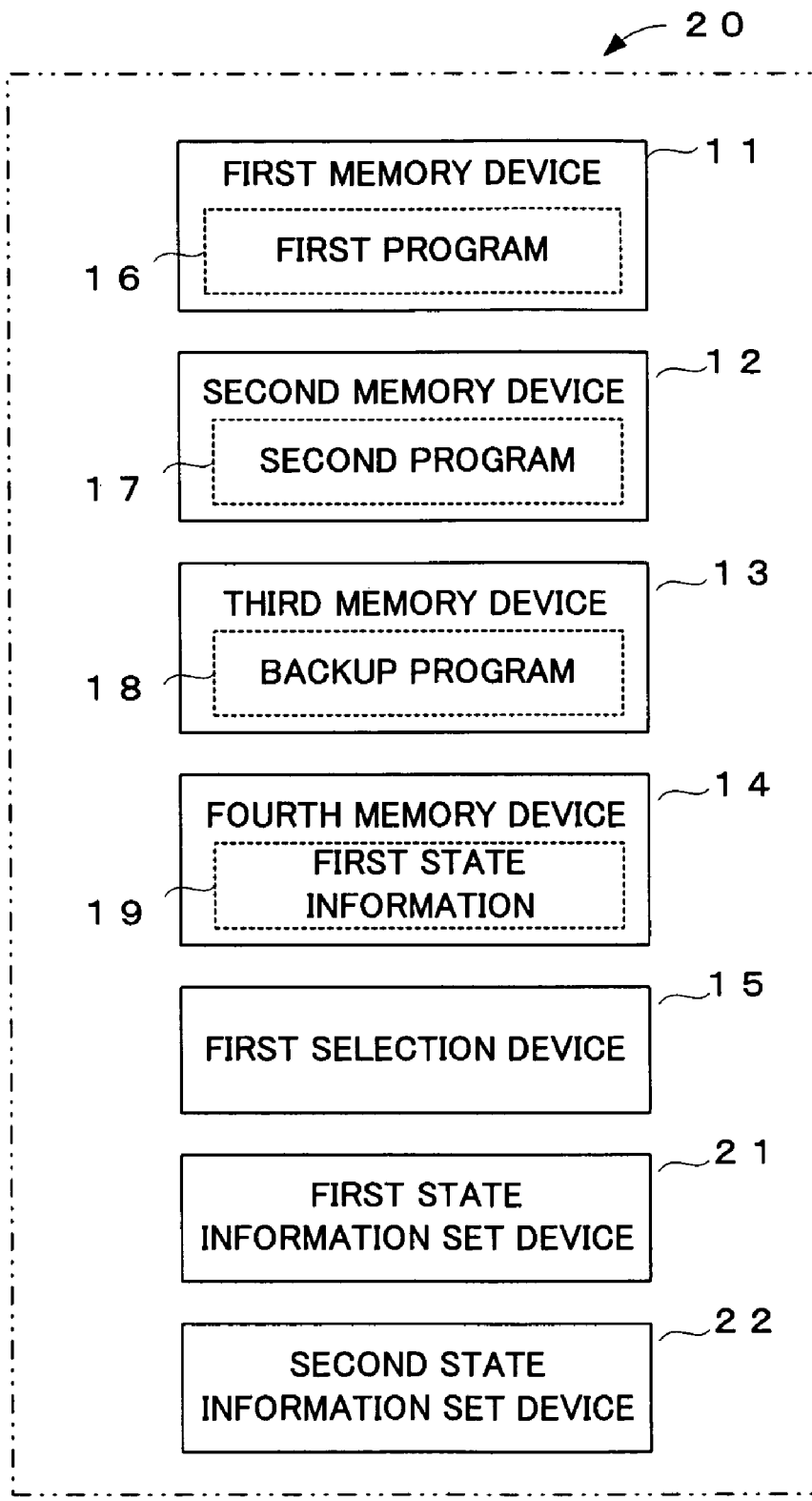
FIG. 2 is a block diagram illustrating an information processing apparatus according to a second embodiment of the present invention.

A second embodiment of the present invention will now be discussed, with reference to FIG. 2. FIG. 2 illustrates an information processing apparatus according to a second embodiment of the present invention. As shown in FIG. 2, similarly to the information processing apparatus 10 according to the first embodiment, the information processing apparatus 20 according to the second embodiment of the present invention is provided with first to fourth memory devices 11, 12, 13 and 14, and a first selection device 15, each memory device storing a first program 16, a second program 17, a backup program 18 and a first state information 19 therein. The information processing apparatus 20 according to the second embodiment is further provided with a first state information set device 21 and a second state information set device 22.

As mentioned above, the first state information 19 is an information substantially indicating that the second program 17 does not properly perform the predetermined processing. Furthermore, as mentioned above, the ways of recognizing a fact that the second program 17 does not properly perform the predetermined processing or the ways of displaying the fact through the first state information 19 are various and not to limited. Nevertheless, the information processing apparatus 20 employs one preferable construction that is achieved with the first state information set device 21 and the second state information set device 22.

That is, the first state information set device 21 is for setting or modifying the first state information 19 to a first content, when the first program 16 execute or executed the second program 17 or the backup program 18. On the other hand, the second state information set device 22 is for setting or modifying the first state information 19 to a second content, when the second program 17 or the backup program 18 ends or ended properly.

More specifically about the operation, the first state information set device 21 sets the first state information 19 to the first content, when the first program 16 executes or executed the second program 17 or the backup program 18. Then, the second state information set device 22 modifies the first state information 19 to the second content, when the second program 17 or the backup program 18 ends or ended properly. As a result, the content of the first state information becomes the second content, when the second program 17 or the backup program 18 ends properly. On the other hand, the content of the first state information 19 remains in the first content, when the second program 17 does not start or does not end properly or when the backup program 18 does not start or does not end properly. Therefore, a fact that the content of the first state information 19 is the first content indicates that the second program does not properly the predetermined processing. For this, the first selection device 15 can select the program with checking whether the content of the first state information 19 is the first content or the second content, in the next time when the first program and the second program are executed. That is, the backup program 18 is selected when the content of the first state information 19 is the first content, while the second program 17 is selected when the content of the first state information is the second content. Thereby, the selection processing can be performed simply and promptly.

The first state information set device 21 and the second state information set device 22 may be embodied in an arithmetic processing circuit such as a CPU. Alternatively, the first state information set device 21 may be embodied in a command that is included in the first program 16. Alternatively, the second state information set device 22 may be embodied in a command that is included in the second program 17 and the backup program 18.

(Third Embodiment)

Figure 3:
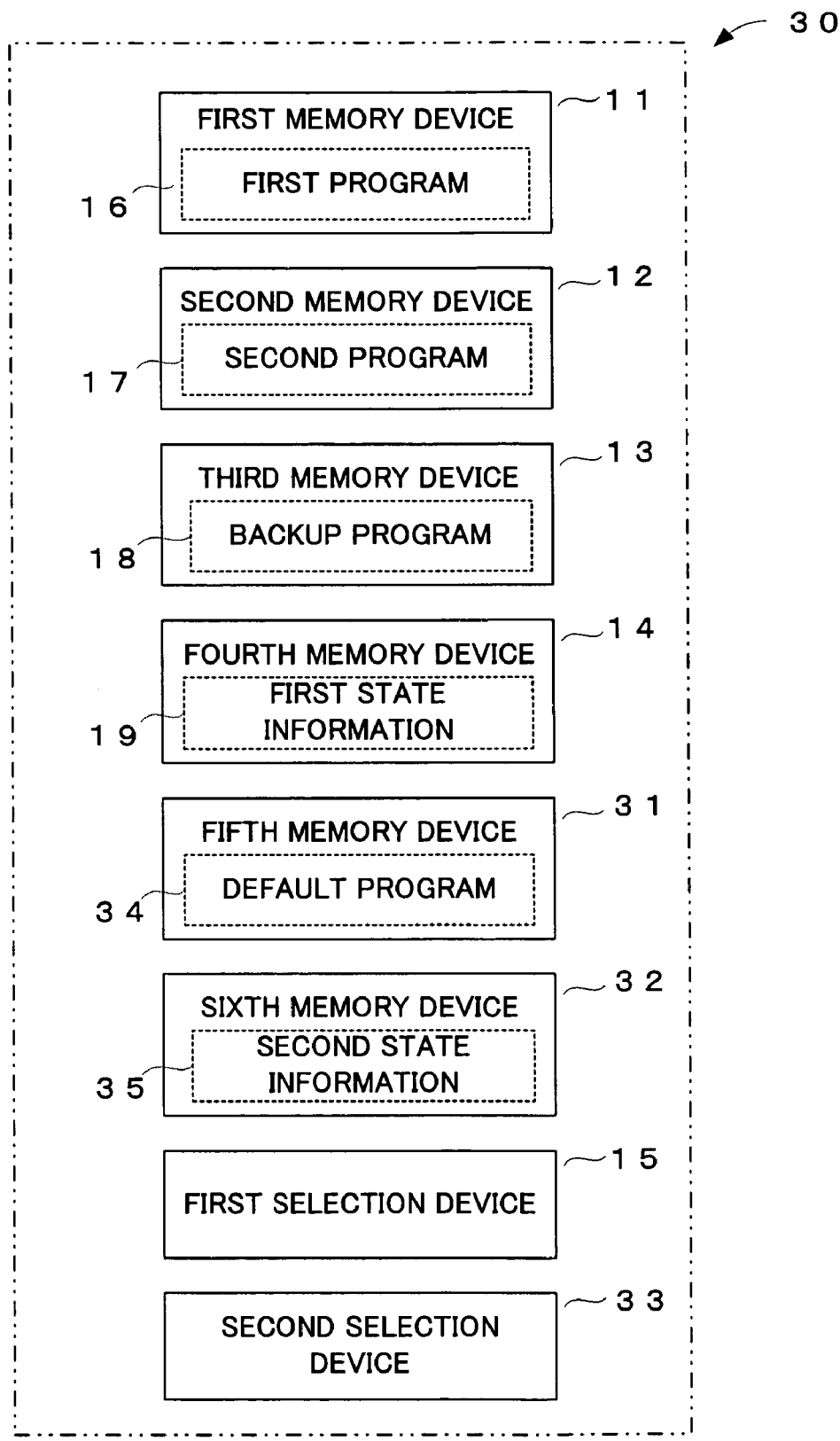
FIG. 3 is a block diagram illustrating an information processing apparatus according to a third embodiment of the present invention.

A third embodiment of the present invention will now be discussed, with reference to FIG. 3. FIG. 3 illustrates an information processing apparatus according to the third embodiment of the present invention. As shown in FIG. 3, similarly to the information processing apparatus 10 according to the first embodiment, the information processing apparatus 30 according to the third embodiment is provided with first to fourth memory devices 11, 12, 13 and 14, and a first selection device 15, each memory device storing a first program 16, a second program 17, a backup program 18 and a first state information 19 therein. The information processing apparatus 30 according to the third embodiment is further provided with fifth and sixth memory devices 31 and 32, and a second selection device 33.

The fifth memory device 31 is for storing a default program 34 of the second program 17. The fifth memory device 31 may be any record medium capable of storing or recording a program such as a computer program or the like. Nevertheless, the fifth memory device 31 may be preferably a read-only and non-volatile record medium, such as a ROM, since the default program 34 is intended to be permanently stored in the fifth memory device 31 from a factory shipment of the information processing apparatus 30.

The default program 34 is a default program of the second program 17. The default program 34 has no defect, and stored in the fifth memory device 31 from the factory shipment of the information processing apparatus 30. For example, the default program 34 has preferably a function to perform the original function of the second program at least, even if it is inferior to the updated second program 17 or the backup program 18 in its processing performance.

The sixth memory device 32 is for storing the second state information 35 substantially indicating that the backup program 18 does not properly perform the predetermined processing. The sixth memory device 32 has almost the same construction as the fourth memory device 14.

The second state information 35 is an information substantially indicating that the backup program 18 does not properly perform the predetermined processing, and has a construction basically the same as the first state information 19.

The second selection device 33 is for selecting either one of the backup program 18 and the default program 34, as a program to be executed in accordance with a command in the first program 16, on the basis of the second state information 35. The second selection device 33 may be embodied in an arithmetic processing circuit or the like such as a CPU, similarly to the first selection device 15. Alternatively, the second selection device 33 may be embodied in a command that is included in the first program 17.

For example, if the first state information 19 indicates that the second program 17 performs properly the predetermined processing, the first selection device 15 recognizes it on the basis of the first state information 19 and selects the second program 17. On the other hand, the first state information 19 indicates that the second program 17 does not properly perform the predetermined processing, the second selection device 33 then performs further selection processing. That is, in this case, the second state information 35 indicates that the backup program 18 performs properly the predetermined processing, the second selection device 33 recognizes it on the basis of the second state information 35, and selects the backup program 18. On the other hand, if the second state information 35 indicates that the backup program 18 does not properly perform the predetermined processing, the second selection device 33 recognizes it on the basis of the second state information 35, and selects the default program 34. Then, a program that is selected by the first selection device 15 and the second selection device 33 is executed in accordance with a command in the first program 16. As a result, the operation of the information processing apparatus 30 is always maintained properly, since at least the default program 34 performs properly the predetermined processing.

Incidentally, the information processing apparatus 30 may be further provided with the first state information set device 21 and the second state information set device 22 (See FIG. 2).

(Fourth Embodiment)

Figure 4:
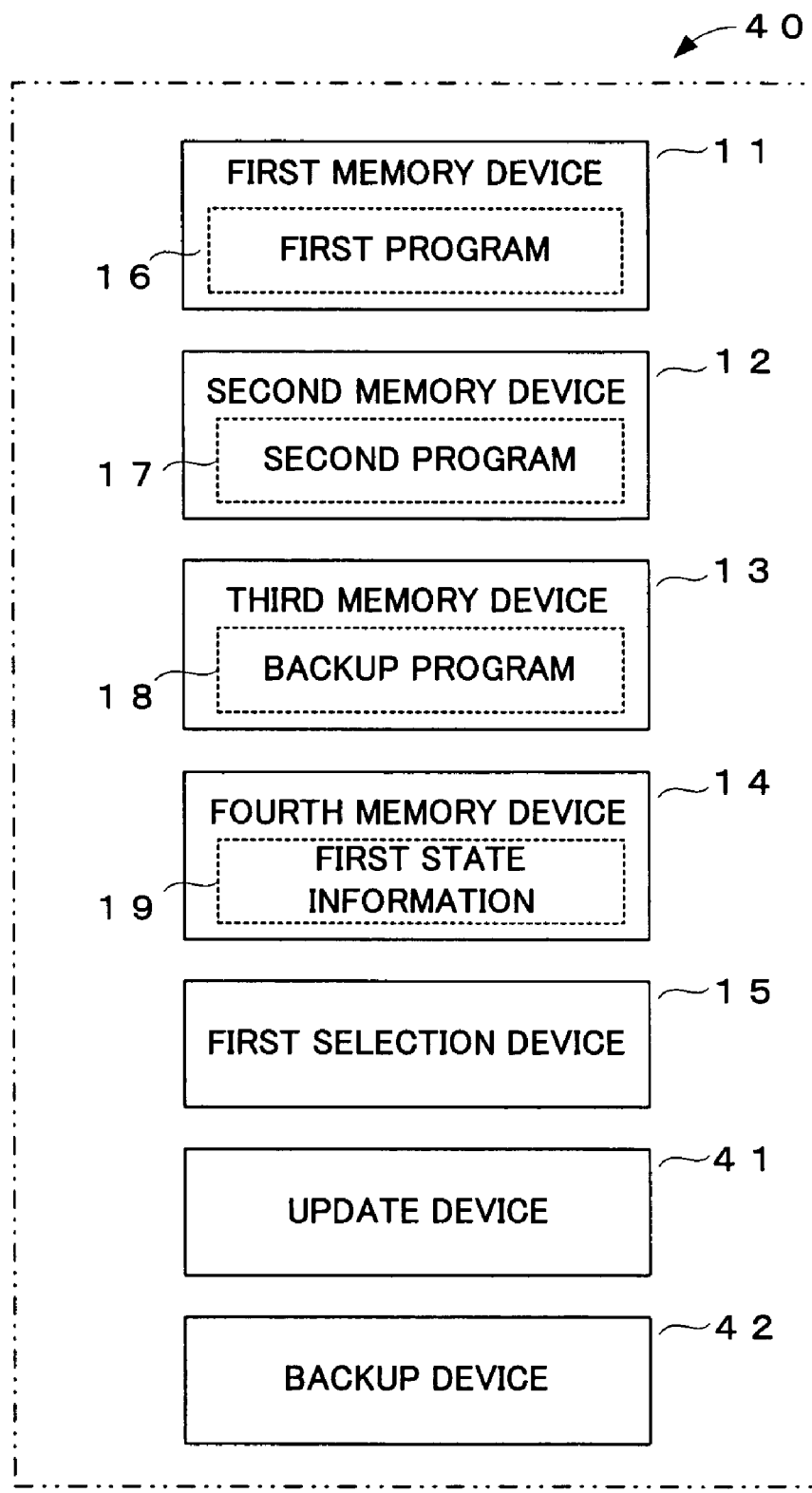
FIG. 4 is a block diagram illustrating an information processing apparatus according to a fourth embodiment of the present invention.

A fourth embodiment of the present invention will now be discussed, with reference to FIG. 4. FIG. 4 illustrates an information processing apparatus according to the fourth embodiment of the present invention. As shown in FIG. 4, similarly to the information processing apparatus 10 according to the first embodiment, the information processing apparatus 40 according to the fourth embodiment is provided with first to fourth memory devices 11, 12, 13 and 14, and a first selection device 15, each memory device storing a first program 16, a second program 17, a backup program 18 and a first state information 19 therein. The information processing apparatus 40 according to the fourth embodiment is further provided with an update device 41 and a backup device 42.

The update device 41 is for updating the second program 17. For example, the update device 41 receives a new second program that is supplied via a communication network, and replaces the existing second program with the new program.

The backup device 42 is for storing the second program 17 that is not still updated by the update device 41, as a backup program 18, in the third memory device 13.

In the information processing apparatus 40, the second program 17 is updated by the update device 41. On the other hand, if the update device 41 fails to update the second program 17 and thereby the updated second program 17 does not properly perform the predetermined processing, the first selection device 15 selects the backup program 18 that is executed in accordance with a command of the first program 17. This backup program 18 is the second program that is not still updated and that is stored as the backup program 18 in the third memory device 13 by the backup device 42. Therefore, if the old version of the second program performs properly the predetermined processing before the second program 18 is updated, the operation of the information processing is always maintained properly.

Incidentally, the information processing apparatus 40 may be further provided with a first state information set device 21, a second state information set device 22 (see FIG. 2), and/or, a fifth memory device 31 (default program 34) and a sixth memory device 32 (a second state information 35), and a second selection device 33 (see FIG. 3).

Various Modes of the Information Processing Apparatus

Either of the aforementioned information processing apparatuses 10 to 40 according to the embodiments of the present invention may be constructed as follows.

That is, the first state information 19 is configured to substantially indicate how many times the second program 17 does not properly perform the predetermined processing. Furthermore, the first selection device 15 compares the number that is indicated by the first state information 19 and the reference number, and selects either one of the second program 17 and the backup program 18, as a program to be executed in accordance with a command in the first program 16, on the basis of the result of the comparison.

In such a configuration, for example, it is checked whether the number indicated by the first state information 19 (the number of improperly execution) is more than a value indicated by the reference number (e.g. a predetermined value), and then either one of the second program 17 and the backup program 18 is selected, on the basis of the result of the comparison. Thereby, the program can be selected properly and effectively.

On the other hand, either one of the information processing apparatuses 10 to 40 may be further provided with a first notice device for generating a notice information substantially indicating that the backup program is selected, or a second notice device for generating a notice information substantially indicating that the default program is selected.

Thereby, it is possible to notify the user of a fact that the second program 17 does not properly perform the predetermined processing, and/or a fact that the old version as the backup program 18 or the default program 34 is alternatively selected.

Incidentally, such modes of the information processing apparatus may be embodied in a specific device integrated with a hard ware, or may be embodied in making a computer read a program.

(Embodiments of Information Processing Method)

The information processing method according to embodiments of the present invention will now be discussed. That is, the information processing method according to embodiments of the present invention is an information processing method executable with an apparatus capable of processing a first program including a command to execute other programs, a second program to perform a predetermined processing in accordance with the command in the first program, a backup program of the second program, and a first state information substantially indicating that the second program does not properly perform the predetermined processing. Furthermore, this information processing method is provided with a first state information set process of setting or modifying the first state information to the first content, a second state information set process of setting or modifying the first state information to the second content, and a selection process of selecting either one of the second program and the backup program, on the basis of the first state information.

According to the information processing method, if the second program performs properly the predetermined processing, the second program is selected, and if the second program does not properly perform the predetermined processing, the backup program is selected, and then the selected program is executed in accordance with the command of the first program. As a result, if it is assumed that the backup program performs properly the predetermined processing, at least the program that is executed in accordance with the command of the first program functions (runs) properly. Thereby, a risk of a serious trouble in the operation of the information processing can be avoided.

EXAMPLES

Examples of the present invention will now be discussed. In the following examples, the information processing apparatus of the present invention is tangibly embodied as an information processing apparatus constituting a part of a television apparatus in a cable digital television broadcasting system.

First Example

A first example of the present invention will now be discussed, with reference to FIG. 5 to FIG. 14.

Figure 5:
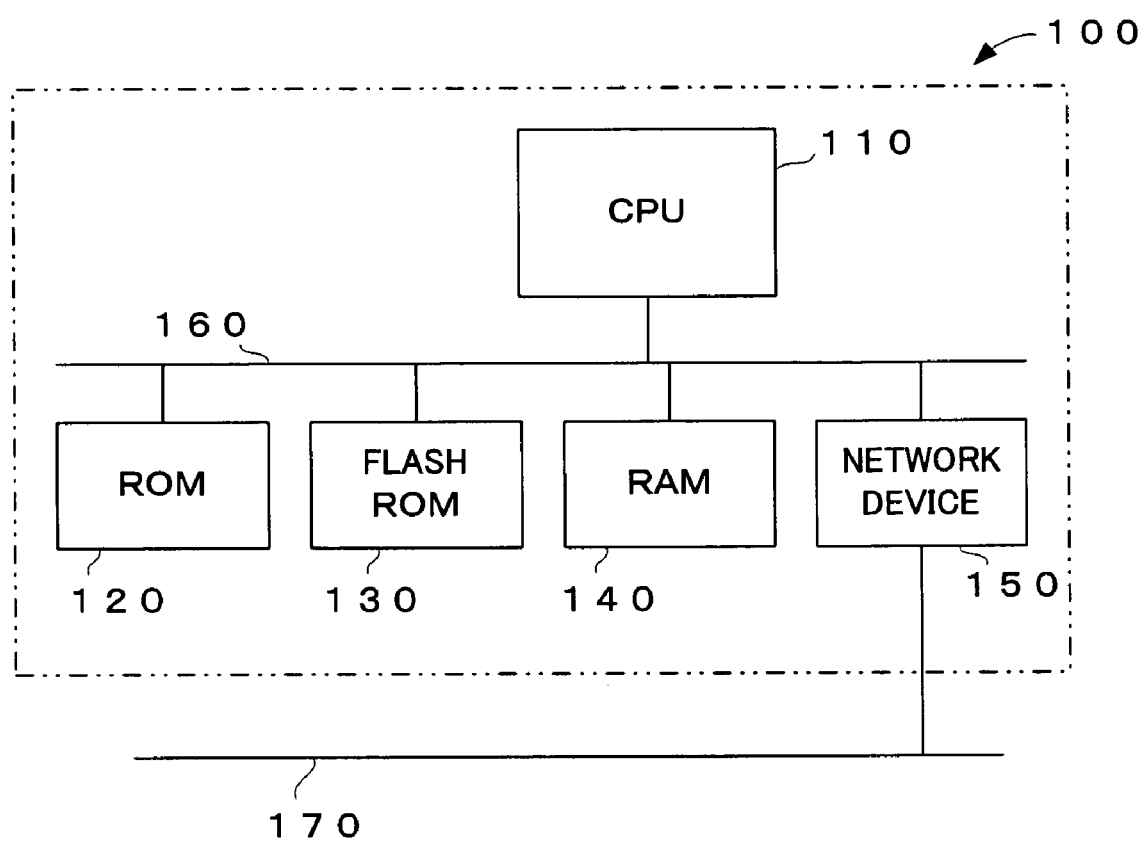
FIG. 5 is a block diagram illustrating an information processing apparatus according to a first example of the present invention.

FIG. 5 illustrates an information processing apparatus according to the first example. As shown in FIG. 5, the information processing apparatus 100 according to the first example is provided with a CPU 110, a ROM 120, a flash ROM 130, a RAM 140, and a network device 150, each of which is connected to each other via a bus 160. Furthermore, the information processing apparatus 100 is connected to a cable network line 170 as a communication line, via the network device 150.

The CPU 110 controls the information processing apparatus 100 to perform various processings by executing programs such as a boot loader, an operating system (hereinafter referred to as "OS"), and various application software or the like to implement the reproduction of video information and audio information for television or to implement information processing.

The aforementioned various programs and data are stored in the ROM 120 or the flash ROM 130. Incidentally, the ROM 120 is a read-only memory, but the flash ROM 130 is recordable/rewritable memory.

The RAM 140 is used as a workspace when the CPU 110 performs various processings.

The network device 150 is an interface circuit to control/establish a connection between the network line 170 and the information processing apparatus 100, when information including programs or data is transmitted/received therebetween.

Figure 6:
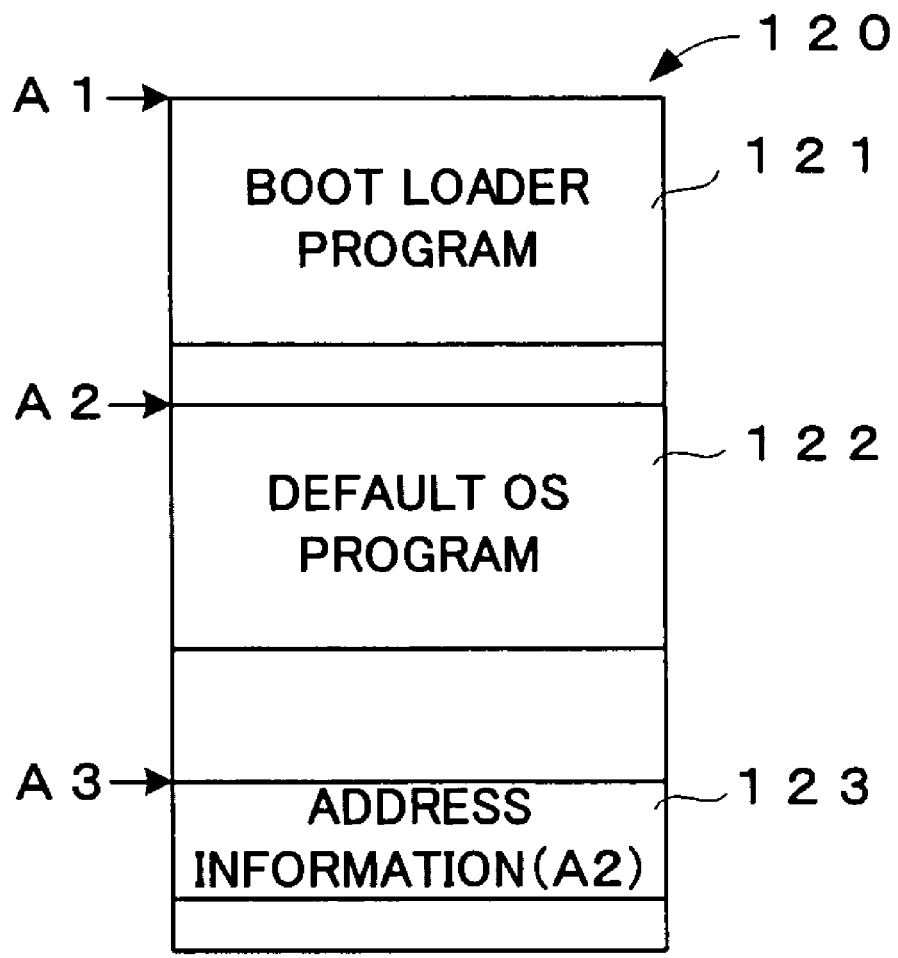
FIG. 6 is an explanation view illustrating a content of a ROM in an information processing apparatus according to the first example of the present invention.

Next, FIG. 6 illustrates a content of the ROM 120. As shown in FIG. 6, in the making process (or before shipment) of the information processing apparatus 100, the ROM 120 stores at least a boot loader program 121, a default OS program 122, and an address information 123 therein, each of which is maintained in unrewritable state. The boot loader program 121 is stored from an address A1 of the ROM 120. The default OS program 122 is stored from an address A2 of the ROM 120. The address information 122 is stored from an address A3 of the ROM 120.

The boot loader program 121 is a program to be executed firstly immediately after the electrical power is supplied to the information processing apparatus 100, and includes a command to select and execute one of a plurality of OS programs stored in the ROM 120 and the flash ROM 130.

The information processing apparatus 100 is provided with a function to download OS programs via the network line 170 and update OS programs. In the case that an OS program is downloaded, an OS program used at the present before updated is stored as a backup program of the OS program. Furthermore, the information processing apparatus 100 has a default OS program 122 in addition to this backup program. Hereinafter, for the sake of convenience, an OS program that is used normally at the present or to be used normally from now on after updated is referred to as a "current OS program", and an OS program to be maintained or stored as a backup program of the current OS program by updating is referred to as a "backup OS program".

The boot loader program 121 usually selects and executes the current OS program. If the current OS program does not run properly due to a certain problem, however, the boot loader program 121 then selects and executes the backup OS program. If the backup OS program does not run properly, or the backup OS program does not exist, however, the boot loader program 121 then selects and executes the default OS program 122.

The default OS program 122 is an OS program that is maintained in the ROM 120 from a time of a factory shipment of the information processing apparatus 100.

The address information 123 is representative of a storage position where the default OS program 122 is stored in the ROM 120, more specifically a value of the head address A2 of the default OS program 122. When the default OS program 122 is executed, the address information 123 is referred.

Figure 7:
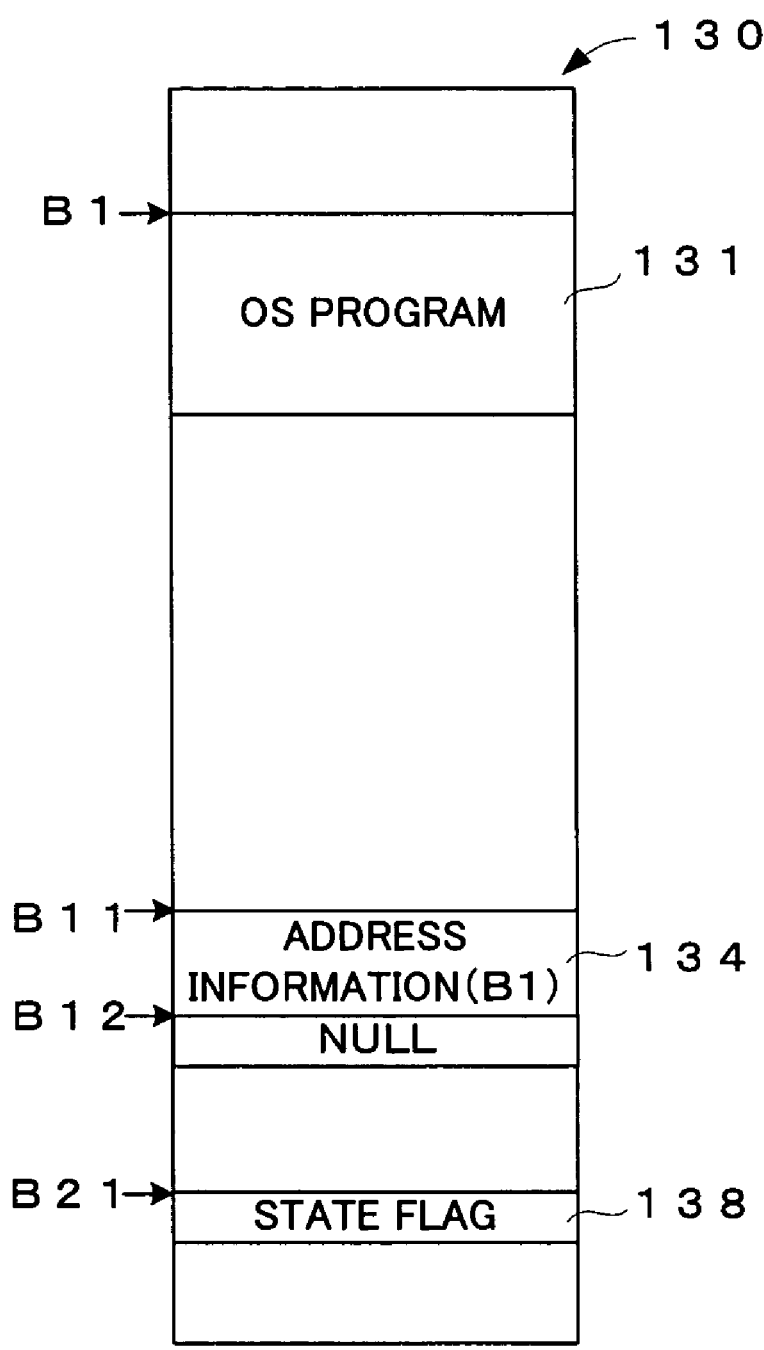
FIG. 7 is an explanation view illustrating a content of a flash ROM, at a time of a factory shipment, in an information processing apparatus according to the first example of the present invention.

Next, FIG. 7 illustrates a content of the flash ROM 130 at a time of a factory shipment of the information processing apparatus 100. As shown in FIG. 7, at a time of the factory shipment, the flash ROM 130 stores an OS program 131, an address information 134, and a state flag 138 therein, each of which is maintained in rewritable state. The OS program 131 is stored from an address B1 of the flash ROM 130. The address information 134 is stored at an address B11 of the flash ROM 130. The state flag 138 is stored at an address B21 of the flash ROM 130.

The OS program 131 is one that is pre-installed into the information processing apparatus 100, and has the same content as the default OS program 122. At a time of the factory shipment, the OS program 131 equals to the current OS program. Nevertheless, once the OS program is updated, the OS program 131 becomes a backup OS program.

The address information 134 is representative of a storage position of the OS program 131, more specifically a value of the head address B1 of the OS program 131. When the OS program 131 is executed, the address information 134 is referred. Once the OS program is updated, the address information 134 is displaced to the address B12 of the flash ROM 130.

The state flag 138 is one that substantially indicates that the current OS program does not properly perform the predetermined processing. For example, the state flag 138 may be a binary data and may be logically embodied in one bit data. More specifically, the state flag 138 is set to "1", if the current OS program runs properly.

Figure 8:
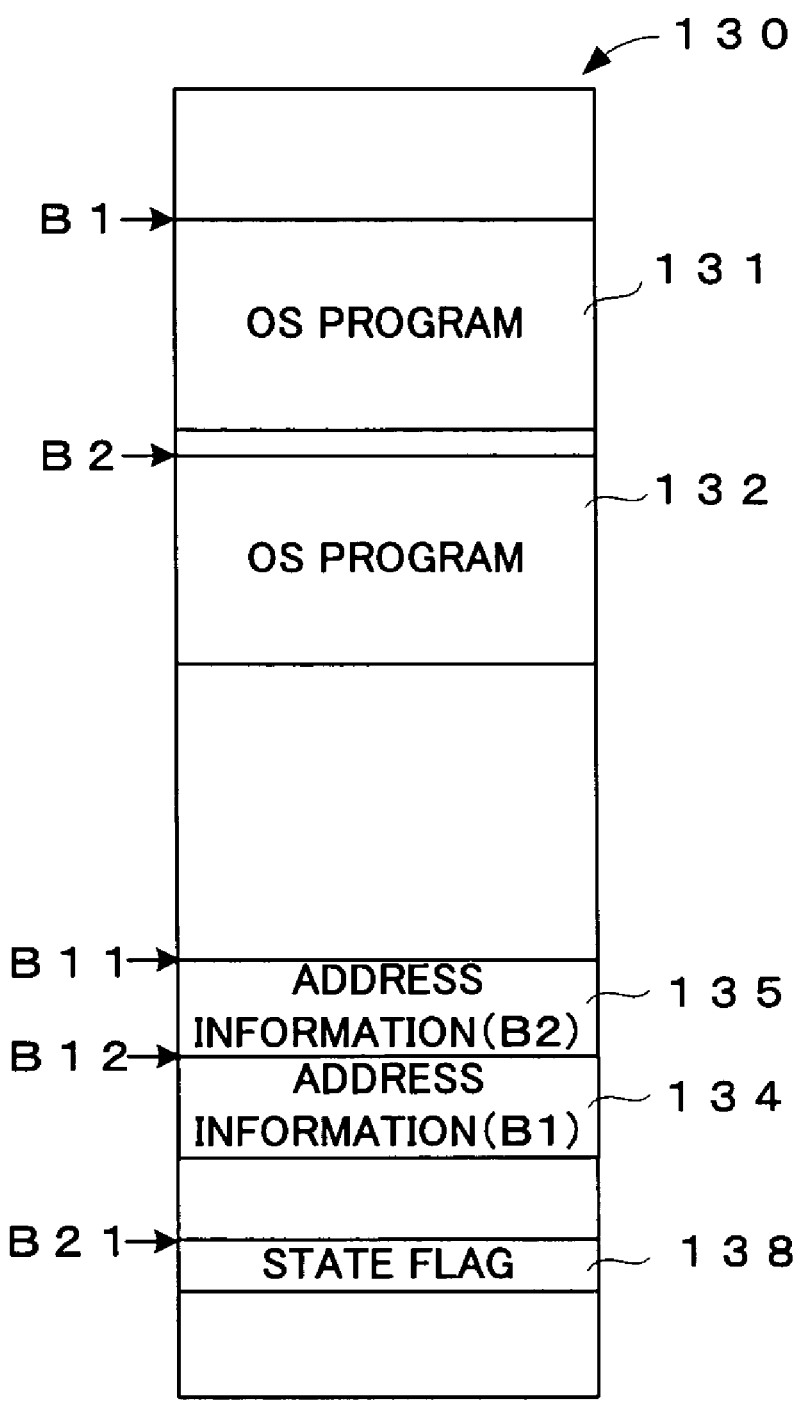
FIG. 8 is an explanation view illustrating a content of a flash ROM, after updated, in an information processing apparatus according to the first example of the present invention.

Next, FIG. 8 illustrates a content of the flash ROM 130 after the OS program is updated. As shown in FIG. 8, the updated flash ROM 130 stores the updated OS program 132 therein, and the address information 134 is displaced to the address B12, and a new address information 135 is stored in the address B11. After updating, the OS program 132 equals to the current OS program, and the OS program 131 equals to the backup OS program.

The address information 135 stored in the address B11 is representative of a storage position of the OS program 132, more specifically a value of the head address B2 of the OS program 132. When the OS program 132 is executed, the address information 135 is referred. Incidentally, the boot loader program is arranged so that the address information stored at the address B11 is referred in the case that the current OS program is to be executed, or the address information stored at the address B12 is referred in the case that the backup OS program is to be executed, or the address information stored at the address A3 of the ROM 120 is referred in the case that the default OS program is to be executed.

Figure 9:
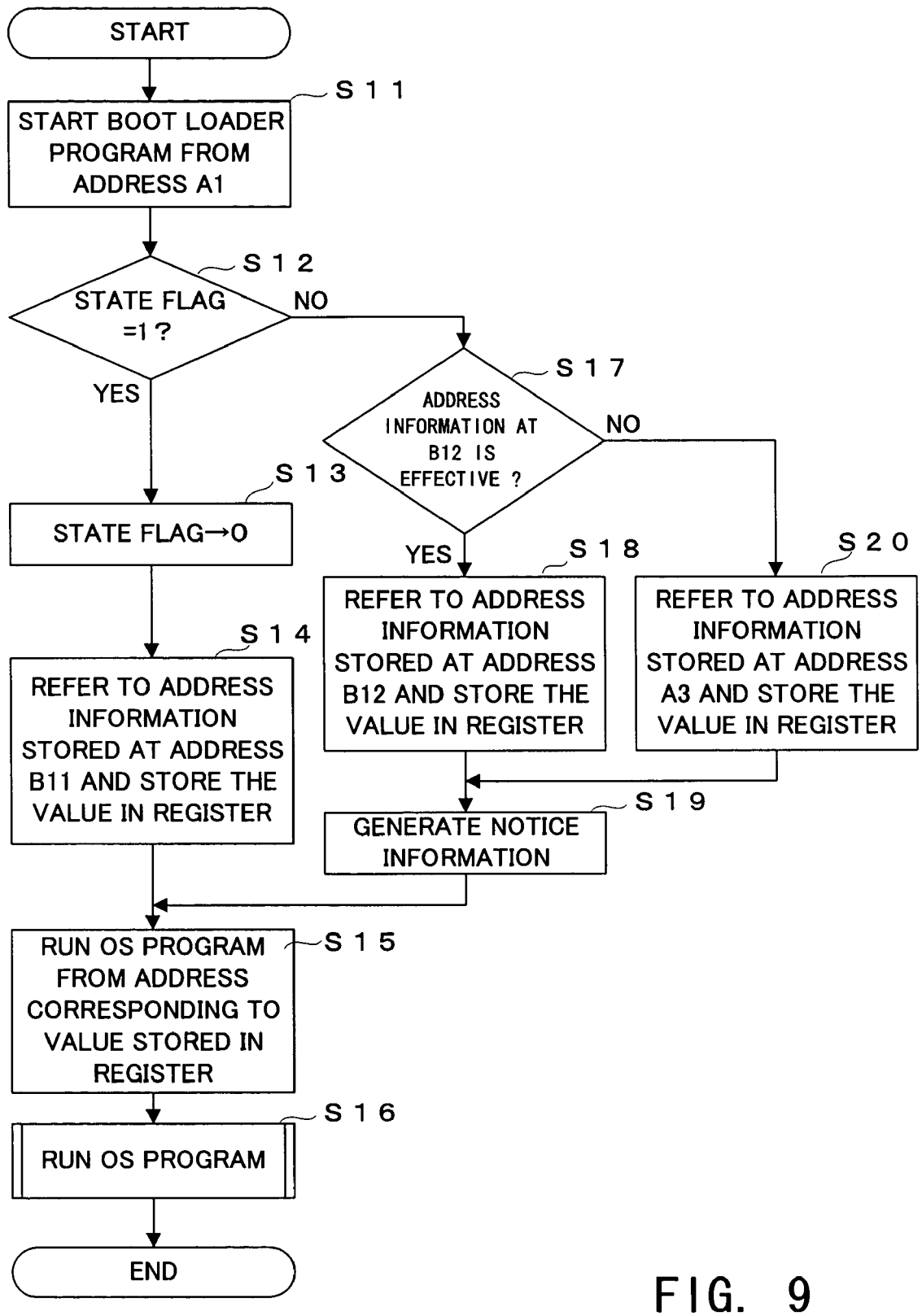
FIG. 9 is a flow chart illustrating an operational flow of a boot loader program in an information processing apparatus according to the first example of the present invention.

Next, FIG. 9 illustrates an operational flow of the CPU 110, when the boot loader program 121 is executed. The boot loader program 121 is to be executed firstly immediately after the electrical power is supplied to the information processing apparatus 100, and has a function to select and execute one of a plurality of OS programs stored in the ROM 120 or the flash ROM 130, as mentioned above, and the function is implemented in accordance with the operational flow of FIG. 9.

That is, once the electrical power is supplied to the information processing apparatus 100, the CPU 110 starts to execute the boot loader program 121 from the address A1 of the ROM 120 (step S11). Then, the CPU 110 functions in accordance with a command sequence of the boot loader program 121.

The CPU 110 firstly judges whether or not the state flag 138 is "1" (step S12). If the OS program runs properly, the state flag 138 is set to "1". Incidentally, how to set the state flag 138 to "1" is discussed later.

If the state flag 138 is "1" (step S12: YES), the CPU 110 sets the state flag 138 to "0" (step 13).

The CPU 110 then refers to the address information stored at the address B11 in the flash ROM 130 and stores the value of the address in the register (step S14). The address information stored at the address B11 in the flash ROM 130 is the value of the head address of the current OS program. Therefore, at the step S14, the value of the head address of the current OS program is set in the register. Incidentally, the register may be of integrated within the CPU 110 or may be a memory area of the RAM 140.

The CPU 110 then executes the OS program from the address corresponding to the value stored in the register (step S15). The current OS program is executed (step S16), since the value that is set in the register at the step S14 equals to the head address of the current OS program.

More specifically, at a time of the factory shipment, the current OS program equals to the OS program 131, and the address information 134 that equals to the value of the head address of the OS program 131 is stored at the address B11 in the flash ROM 130, as shown in FIG. 7. Therefore, after the processings at the steps S14 and S15, the OS program 131 is executed at the step S16.

On the other hand, once the OS program is updated, as shown in FIG. 8, the current OS program equals to the OS program 132, and the address information 135 that equals to the value of the head address of the OS program 132 is stored at the address B11 in the flash ROM 130. Therefore, after the steps S14 and S15, the OS program 132 is executed at the step S16.

Now, at the step S12 in FIG. 9, if the state flag 138 is not "1" (step S12: NO), it is assumed that the current OS program does not run properly (discussed later). In this case, the CPU 110 then judges whether or not the address information of the address B12 in the flash ROM 130 is effective (step S17). If the backup OS program that runs properly exists in the flash ROM 130, the value of the head address of the backup OS program is stored as the address information at the address B12. In this case, it is judged that the address information is effective at the step S17. On the other hand, at a time of the factory shipment, the backup OS program does not exist in the flash ROM 130, and an information indicating it (e.g. NULL) is stored at the address B12. In this case, it is judged that the address information is not effective at the step S17. Furthermore, if there is a specific reason for a fact that the backup OS program exists in the flash ROM 130 but does not run properly, the specific value out of the range for the usual address value is stored at the address B12. Also in this case, it is judged that the address information is not effective at the step S17.

If the address information at the address B12 is effective (step S17: YES), the CPU 110 refers to the address information stored at the address B12, and stores the value of the address information in the register (step S18). The address information stored at the address B12 in the flash ROM 130 equals to the value of the head address of the backup OS program. Therefore, at the step S18, the value of the head address of the backup OS program is stored in the register.

The CPU 110 then generates notice information (step S19). FIG. 14 illustrates an example of the notice information. Thereby, the user knows that the current OS program is not to be executed.

The CPU 110 then executes the OS program from the address corresponding to the value stored in the register (step S15). Since the value that is set in the register at the step S18 equals to the head address of the backup OS program, the backup OS program is executed (step S16).

More specifically, once the OS program is updated, the OS program 131 equals to the backup OS program, as shown in FIG. 8. Furthermore, the address information 134 that equals to the value of the head address of the OS program 131 is stored at the address B12 in the flash ROM 130. Therefore, after the steps S18 and S15, the OS program 131 is executed at the step S16.

On the other hand, at the step S17 in FIG. 9, if the address information at the address B12 is not effective (step S17: NO), the CPU 110 refers to the address information stored at the address A3 in the ROM 120 and stores the value of the address information in the register (step S20). The address information stored in the address A3 in the ROM 120 equals to the head address A2 of the default OS program 122. Therefore, at the step S20, the head address A2 of the default OS program 122 is set in the register.

The CPU then generates a notice information (step S19), and executes the OS program from an address corresponding to the value stored in the register (step S15). As a result, the default OS program 122 is executed (step S16).

Figure 10:
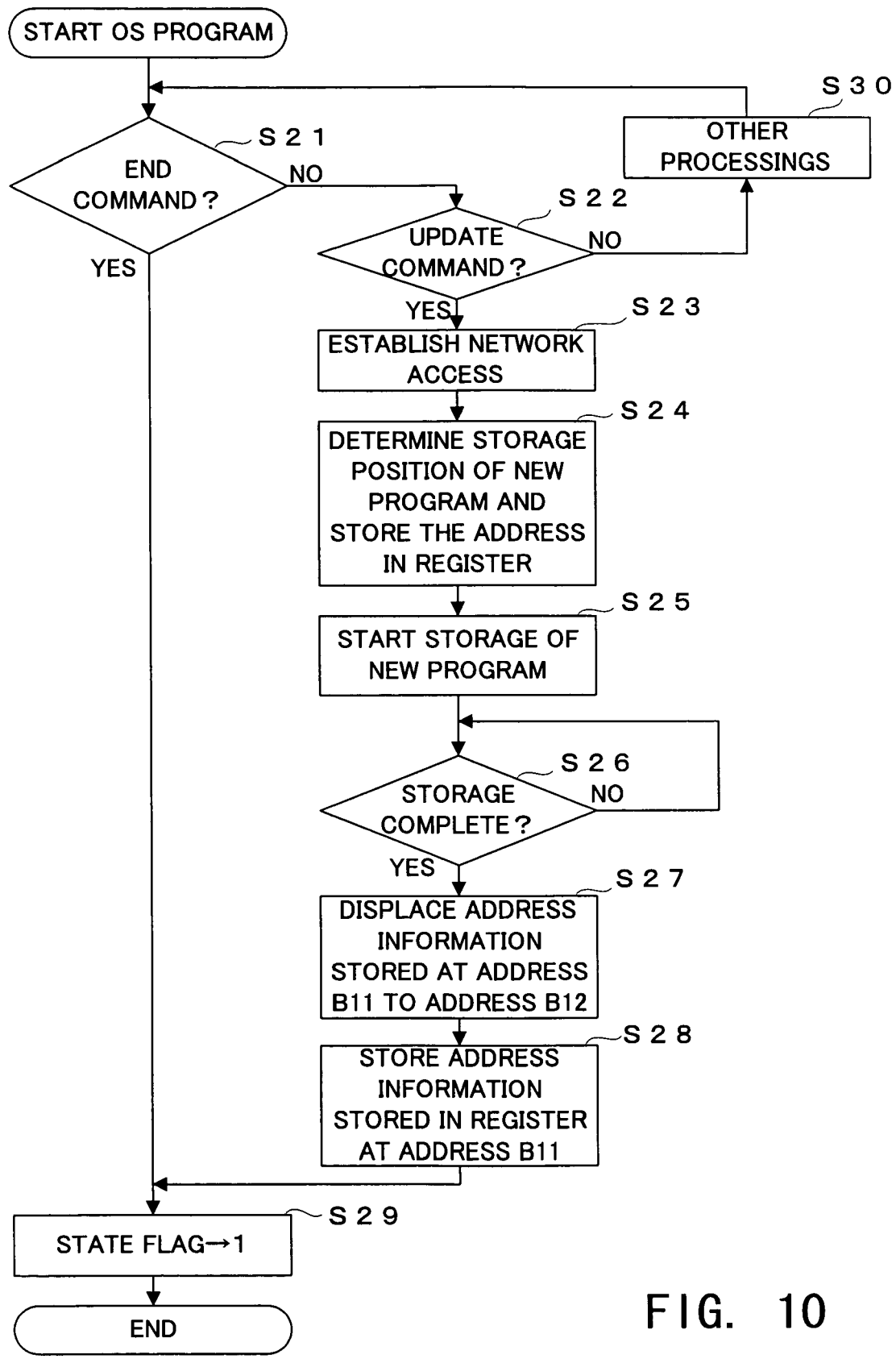
FIG. 10 is a flow chart illustrating an operational flow of an operating system program in an information processing apparatus according to the first example of the present invention.

Next, FIG. 10 illustrates an operational flow of the CPU 110, when either one of the OS programs 131, 132 and 122 is selected and executed. Incidentally, the OS programs 131, 132 and 122 are the same to each other as for the fundamental purpose and construction, but different to each other as for specific functions. For example, the updated OS program may be further provided with a function that is not provided for the pre-installed OS program or the default OS program. Nevertheless, all of the OS programs 131, 132 and 122 have a command sequence to perform at least the processings of the steps S21 to S29 in FIG. 10.

If either one of the OS programs 131, 132 and 122 is selected and the execution thereof is started by the execution of the boot loader program 121 (steps S15 and S16 in FIG. 9), the CPU then judges whether or not an end command of the OS program is inputted (step S21), as shown in FIG. 10. The end command of the OS program may be inputted when the electrical power to the information processing apparatus 100 is shutoff by the user, for example.

If the end command is not inputted (step S21: NO), the CPU 110 then judges whether or not the update command is inputted (step S22). For example, in the case that the user makes access to the server in the management company or the like of the television broadcasting system or the broadcasting station and downloads a new OS program into the information processing apparatus 100 via the network line 170, the update command is inputted.

If the update command is not inputted (step S22: NO), the CPU 110 executes other processings in accordance with the command sequence of the OS program (step S30).

On the other hand, if the update command is inputted (step S22: YES), the CPU 110 executes the update processings of the steps S23 to S28, in accordance with command sequence of the OS program.

That is, firstly, a connection is established between the information processing apparatus 100 and the network line 170 via the network device 150 (step S23), and a position where a new OS program is to be stored in the flash ROM 130 is determined and the address thereof (hereinafter referred to as "new OS program address") is stored in the register (step S24). Then, the download of the new OS program is started via the network line 170, and the downloaded OS program is stored from the new OS program address in the flash ROM 130 (step S25). Once storing process is completed (step 526: YES), the address information stored at the address B11 in the flash ROM 130 is displaced to the address B12 (step S27). Then, the new OS program address stored in the register is stored at the address B11 (step S28).

Now, an operational flow of the update processing will be discussed more specifically, with reference to FIG. 7 and FIG. 8. As shown in FIG. 7, at a time of the factory shipment, only the OS program 131 is pre-installed in the flash ROM 130, and the address information 134 indicating the head address of the OS program 131 is stored at the address B11. If the OS program is to be updated by downloading the new OS program 132 in this state, the address B2 of the flash ROM 130 is stored to the register in order to indicate a position where the new OS program 132 is to be stored, and then the download of the new OS program is started via the network line 170, and the downloaded OS program 132 is recorded from the address B2 of the flash ROM 130, as shown in FIG. 8. Once the storage processing is completed, the address information 134 stored at the address B11 is displaced to the address B12, and the value of the address B2 stored in the register is stored as the address information 135 at the address B11.

Once such a series of update processings is completed, as shown in FIG. 10, the CPU 110 sets the state flag 138 to "1" (step S29), and terminates the execution of the OS program executing at the present.

On the other hand, if the update command is not inputted and the end command is inputted (step S21: YES), the CPU 110 sets the state flag 138 to "1" (step S29) and terminates the execution of the OS program executing at the present.

Figure 11:
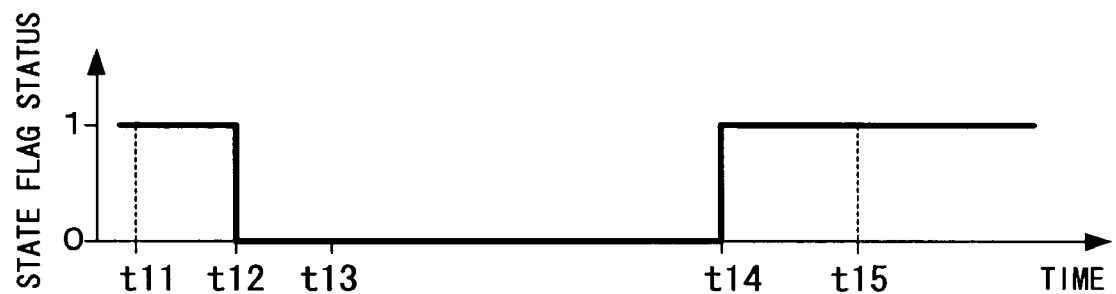
FIG. 11 is a timing chart illustrating a state of a state flag in an information processing apparatus according to the first example of the present invention.
Figure 12:
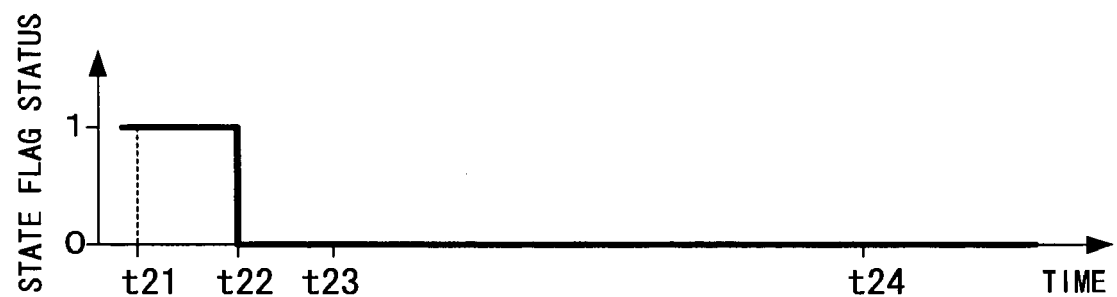
FIG. 12 is a timing chart illustrating another state of a state flag in an information processing apparatus according to the first example of the present invention.
Figure 13:
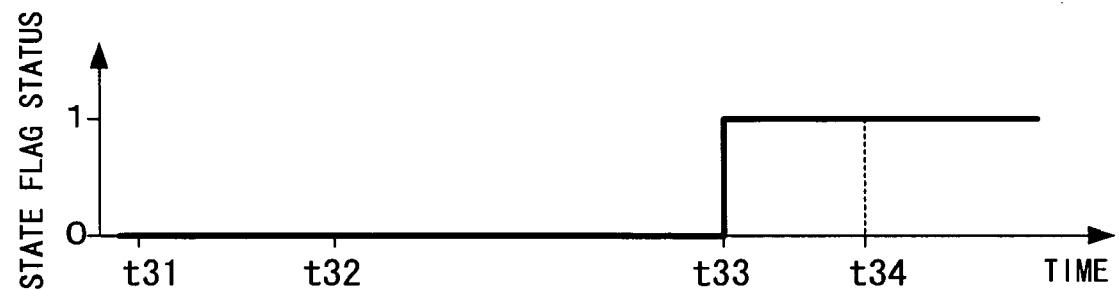
FIG. 13 is a timing chart illustrating another state of a state flag in an information processing apparatus according to the first example of the present invention.

Next, FIG. 11 to FIG. 13 are timing charts to indicate a status change in the state flag 138, when the boot loader 121 and the OS program are executed. For example, in the case that the current OS program always runs properly, the state flag 138 changes as shown in FIG. 11. That is, the OS program runs properly and ends properly at the previous time, the state flag 138 is set to "1" when the OS program is terminated. Thereby, at a time point when the boot loader program 121 is executed, the state flag 138 is "1" (at a time point "t11"). As a result, the boot loader program 121 selects the current OS program. Then, after the boot loader program 121 sets the state flag 138 to "0" (at a time point "t12"), the boot loader program 121 starts to execute the current OS program (at a time point "t13"). Then, when the execution of the current OS program terminates properly, the current OS program sets the state flag to "1" (at a time point "t14"), and this state is maintained even after the current OS program is terminated (at a time point On the other hand, for example, in the case that the current OS program runs properly at the previous time but does not run properly at the present time, the state flag changes as shown in FIG. 12. The case that the current OS program runs properly at the previous time but does not run properly at the present time may be a case that the OS program is updated during the previous execution of the current OS program, and the update processing is succeeded but the updated OS program has a certain defect therein, for example. In such a case, the state flag 138 is set to "1" (at a time point "t21"), since the OS program is terminated properly at the previous time. As a result, the boot loader program 121 selects the current OS program. Then, after the boot loader program 121 sets the state flag 138 to "0" (at a time point "t22"), the boot loader program 121 starts to execute the current OS program (at a time point "t23"). Nevertheless, the current OS program then does not run properly due to the defect in the program, and does not terminate even if the end command is inputted. In such a case, the state flag 138 remains in "0", since the processing at the step S29 in FIG. 10 is not executed. The state flag 138 remains in "0", even if the user inevitably shutoff the power supply to the information processing apparatus 100 (at a time point "t24").

On the other hand, also in the case that the update processings (steps S22 to S28 in FIG. 10) of the OS program are executed during the execution of the current OS program (t23 to t24), a trouble arises during the update processings, and thereby the current OS program does not terminates properly, the state flag 138 remains in "0".

On the other hand, for example, in the case that the current OS program does not run properly at the previous time but the current OS program runs properly at the present time, the state flag 138 changes as shown in FIG. 13. The case that the current OS program does not run properly at the previous time but the current OS program runs properly at the present time may be a case that the OS program having no defect is successfully updated, by re-updating the OS program on the backup OS program or the default OS program at the previous time. In such a case, the state flag 138 is "0" (at a time point "t31"), since the OS program does not terminate properly at the previous time. As a result, the boot loader program 121 selects the backup OS program or the default OS program and starts to execute either of them (at a time point "t32"). Then, when the execution of the backup OS program or the default OS program terminates properly, the OS program executing at the present sets the state flag 138 to "1" (at a time point "t33") and maintains as it is (at a time point "t34").

As discussed above, according to the information processing apparatus 100, the current OS program is selected and executed, if it runs properly. On the other hand, the backup OS program is selected and executed, if the current OS program does not run properly. Furthermore, the default OS program is selected and executed, if neither the current OS program nor the backup OS program runs properly. Thus, a risk that the information processing apparatus 100 does not run totally, or a risk that the majority of the functions thereof are lost, can be avoided, since the alternative OS program runs properly even in the case that any one of the OS programs does not run properly.

Since the backup OS program and the default OS program are prepared as the alternative program of the current OS program, the information processing apparatus 100 can be rescued flexibly and robustly from troubles of the current OS program. For example, since the backup OS program is the old version of the current OS program that is not still updated, the backup OS program is intended to have a function superior to the default OS program, if the OS program is provided with more superior function every time when it is updated. On the other hand, since the default OS program is an OS program at a time of the factory shipment, it has high reliability and runs properly without exception, even though it has just fundamental functions. It is therefore advantageous to prepare these two kinds of OS programs different to each other in their properties or characteristics, for a rescue in an emergency.

The selection operation can be performed easily and promptly, since the OS program capable of running properly is selected on the basis of the state flag 138.

Furthermore, the OS program capable of running properly is accurately distinguished, since the state flag 138 is set in a certain state (e.g. "1") when the OS program is terminated, and it is judged whether or not the previous execution of the OS program is proper, on the basis of a fact that the state flag 138 is set in the certain state.

Incidentally, in FIG. 8, the case that two OS programs are stored in the flash ROM 130, one of which is the current OS program, the other of which is the backup OS program is discussed, nevertheless, the present invention is not limited to the aforementioned case and may be arranged so that three or more OS programs are stored in the flash ROM 130, one of which is the current OS program, the remains of which are the backup OS programs. For example, it may be arranged so that all of the OS programs that are used at the last time, at the last but one and so on are stored as the backup OS programs every time when the OS program is updated, and one of these OS programs is selected and executed by the boot loader program, in a case that the current OS program does not run properly when the OS program is to be executed.

Furthermore, with regard to the boot loader program 121 as shown in FIG. 9, it is arranged so that the notice information is generated at the step S19, nevertheless, it may be arranged, in addition to the aforementioned arrangement, so that the processing is set in a waiting mode at the step S19, for asking a permission of the user to execute the backup OS program and for executing the backup OS program if the user permits it (e.g. a permission input is given), or for immediately terminating the processing without executing the backup OS program if the user does not permits it (e.g. a prohibition input is given).

Second Example

A second example of the present invention will now be discussed, with reference to FIG. 15 to FIG. 19. Incidentally, in the after-mentioned second example, the components the same as those of the first example carry the same numerals and the explanation thereof is omitted. The information processing apparatus according to the second example is characterized in that a state counter and a success counter are employed instead of the state flag, and it is recognized how many times the OS program does not run properly on the basis of values from these two counters, and the OS program is selected on the basis of this recognition.

Figure 15:
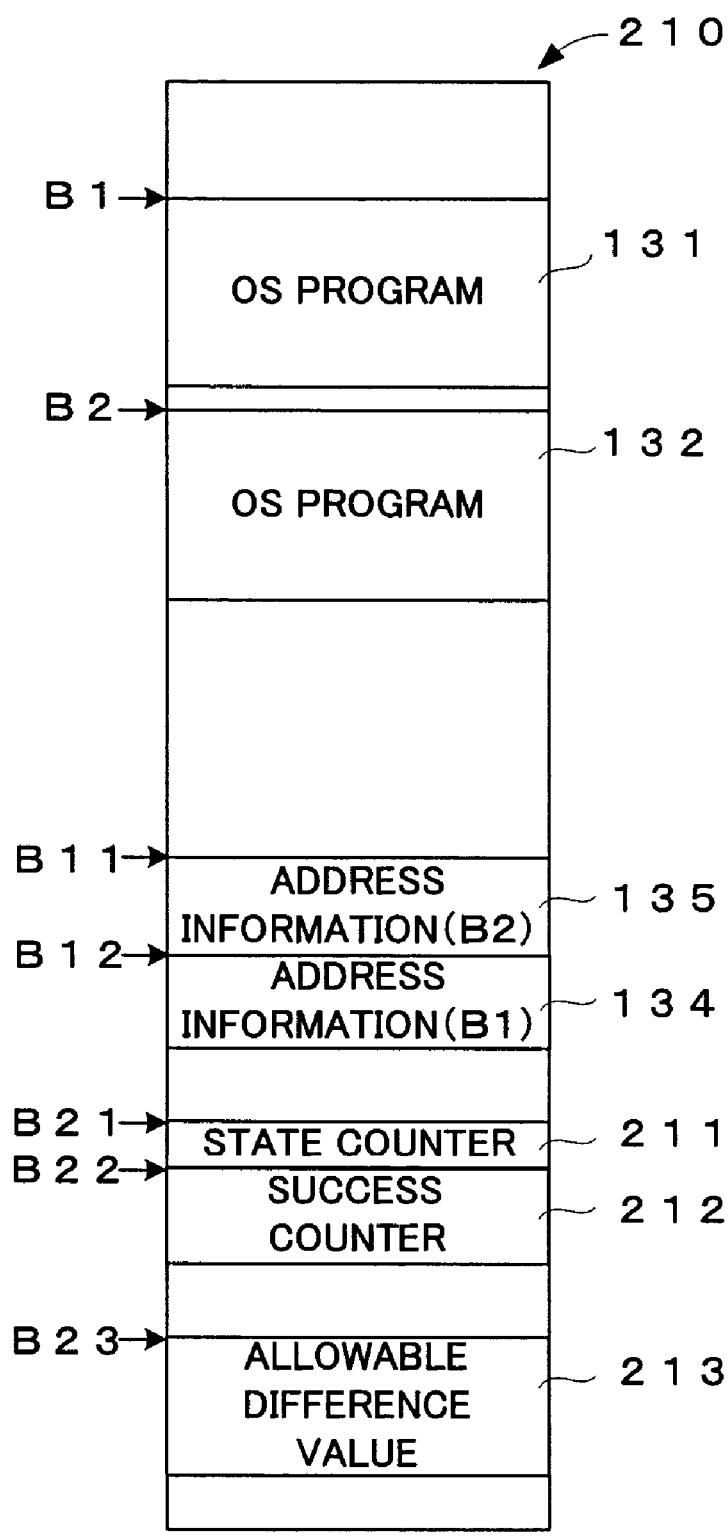
FIG. 15 is an explanation view illustrating a content of a flash ROM in an information processing apparatus according to the second example of the present invention.

FIG. 15 illustrates a content of a flash ROM 210 disposed in the information processing apparatus according to the second example. The content of the flash ROM 210 shown in FIG. 15 is a content in which the OS program is once updated from the factory shipment. Therefore, the OS program 132 is stored as the current program, and the OS program 131 is stored as the backup OS program. Then, a head address of the OS program 132 is stored as an address information 135, and a head address of the OS program 131 is stored as an address information 134. Although these features are the same as the content of the flash ROM 130 of the information processing apparatus 100 according to the first example (see FIG. 8), the flash ROM 210 of the information processing apparatus according to the second example stores therein the state counter 211, the success counter 212 and the allowable difference value 213.

The state counter 211 and the success counter 212 are increased/decreased as for their counter values otherwise set to predetermined values respectively, under control of the CPU 110. More specifically, the state counter 211 counts how many times the current OS program is executed. The success counter 212 counts how many times the OS program is successfully terminated. If the update of the OS program is successfully terminated, the state counter 211 and the success counter 212 are reset to "0" respectively. Incidentally, the state counter 211 and the success counter 212 are set to the same value to each other at a time of the factory shipment.

The allowable difference value 213 is a pre-fixed value. Incidentally, the allowable difference value 213 may be arranged so that it is changed through the user's input or other program's commands.

Figure 16:
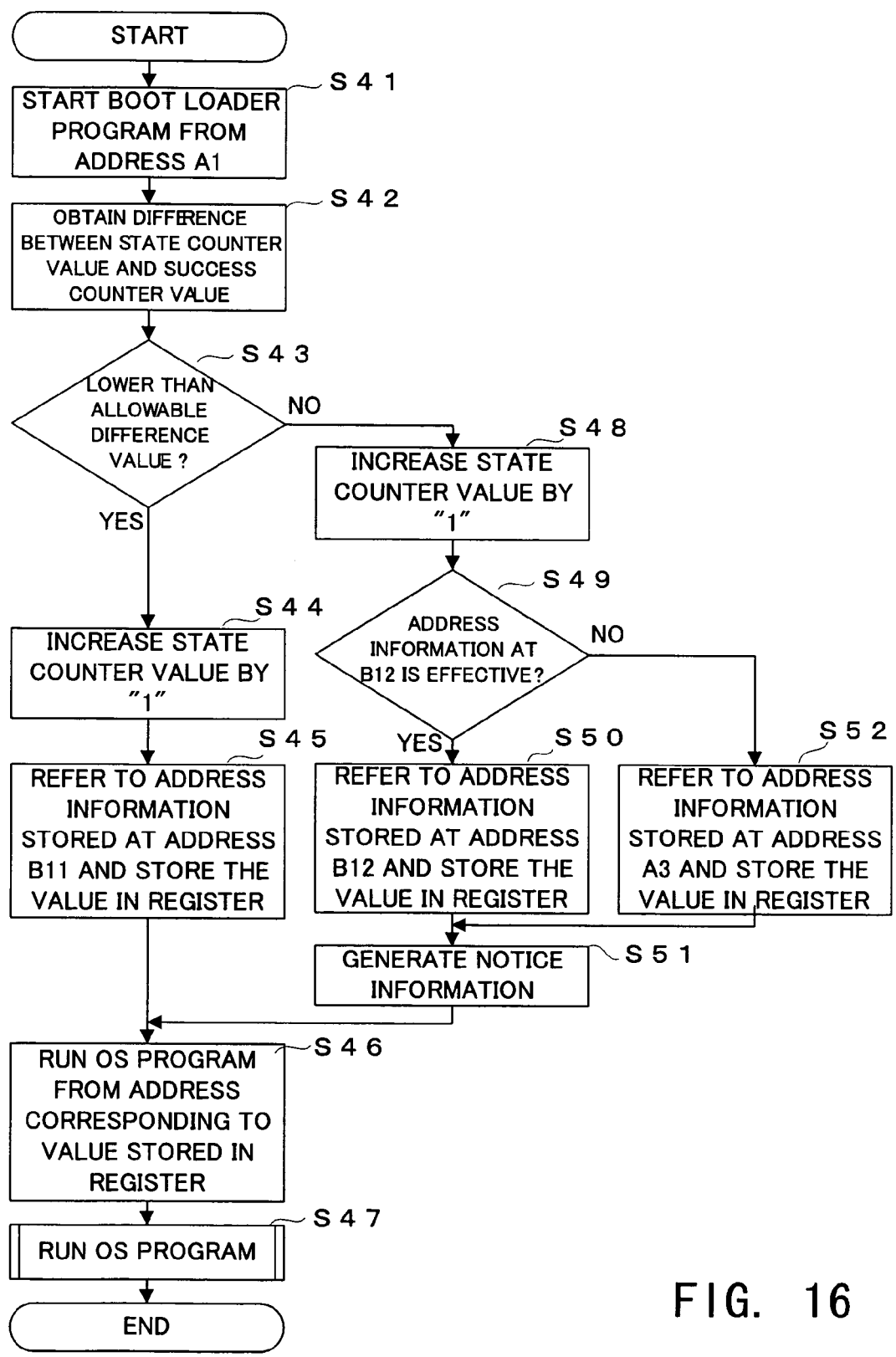
FIG. 16 is a flow chart illustrating an operational flow of a boot loader program in an information processing apparatus according to the second example of the present invention.

Next, FIG. 16 illustrates an operational flow of the CPU 110 when the boot loader program is executed in the information processing apparatus according to the second example.

As shown in FIG. 16, once the power is supplied to the information processing apparatus, the CPU 110 starts to execute the boot loader program 121 from an address A1 of the ROM 120 (step S41).

The CPU 110 firstly computes a difference between the counter value of the state counter 211 and the counter value of the success counter 212 (step S42), and judges whether or not the difference between both counter values are lower than the allowable difference value 213 (step S43). If the difference between both counter values is lower than the allowable difference value 213, it is assumed that the current OS program runs properly after updated, otherwise it is assumed that times that the current OS program does not run properly is relatively low.

Then, if the difference between both counter values is lower than the allowable difference value 213 (step S43: YES), the CPU 110 selects and executes the current OS program (steps S45 to S47), after increasing the counter value of the state counter 211 by "1" (step S44).

On the other hand, if difference between both counter values equals to or higher than the allowable difference value 213 (step S43: NO), the CPU 110 selects and executes the backup OS program or the default OS program (steps S46, S47, S49 to S52), after increasing the counter value of the state counter 211 by "1" (step S48).

Figure 17:
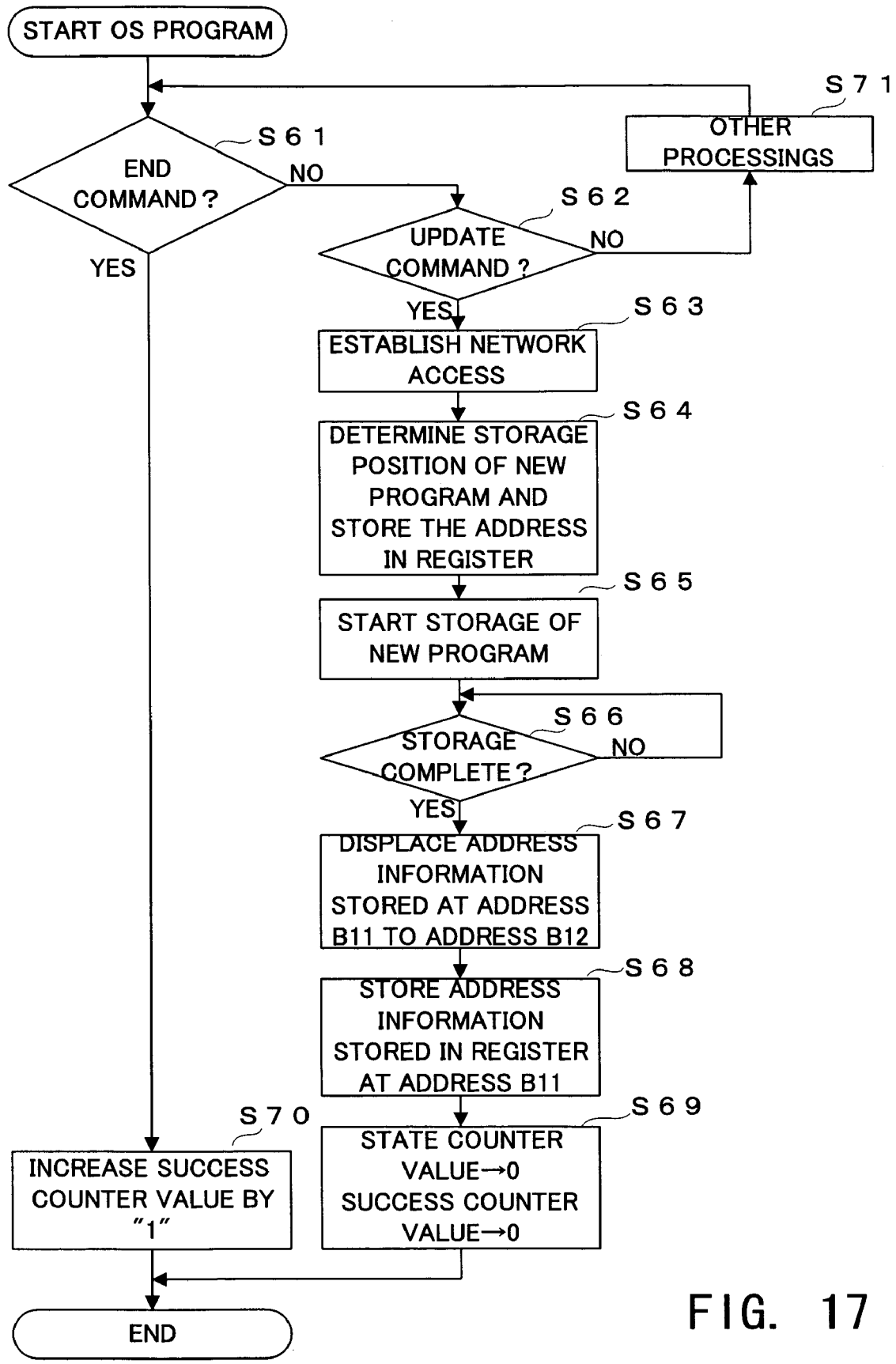
FIG. 17 is a flow chart illustrating an operational flow of an operating system program in an information processing apparatus according to the second example of the present invention.

Next, FIG. 17 illustrates an operational flow of the CPU 110 when the OS program is executed in the information processing apparatus according to the second example.

The operational flow of the CPU 110 when the OS program is executed in the information processing apparatus according to the second example is almost the same as the operational flow of the CPU 110 in the information processing apparatus 100 according to the first example in their major parts. The difference parts between them are a part that the counter values of the state counter 211 and the success counter 212 are reset to "0" respectively (step S69) after the completion of the update processing (steps S63 to S68), and a part that the counter value of the success counter 212 is increased by "1" (step S70) when the end command is inputted (step S61: YES).

Figure 18:
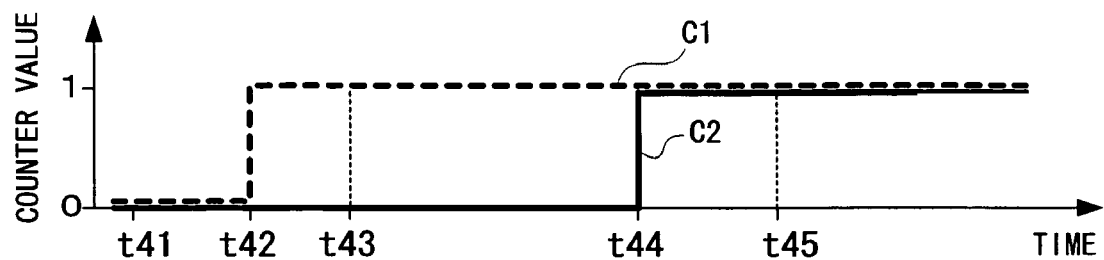
FIG. 18 is a timing chart illustrating respective counter values of a state counter and a success counter in an information processing apparatus according to the second example of the present invention.
Figure 19:
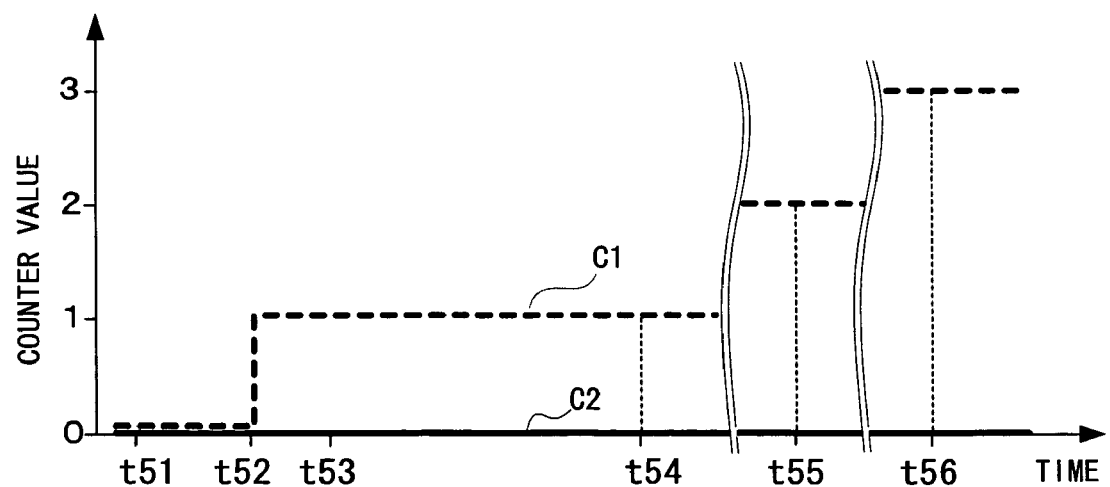
FIG. 19 is another timing chart illustrating respective counter values of a state counter and a success counter in an information processing apparatus according to the second example of the present invention.

Next, FIG. 18 and FIG. 19 are timing charts showing changes in the counter values of the state counter 211 and the success counter 212 respectively, when the boot loader program and the OS program according to the second example are executed. Incidentally, in each chart of FIG. 18 and FIG. 19, a broken line C1 shows a change in the counter value of the state counter 211, and a solid line C2 shows a change in the counter value of the success counter 212.

For example, in the case that the OS program is updated and runs properly after this update processing, the respective counter values of the state counter 211 and the success counter 212 change as shown in FIG. 18. That is, once the OS program is updated, the respective counter values of the state counter 211 and the success counter 212 are reset to "0" (step S69 in FIG. 17). Therefore, when the boot loader program is again executed later, the respective counter values of the state counter 211 and the success counter 212 are "0" (at a time point "t41"). As a result, the boot loader program selects the current OS program (i.e. the updated OS program), since the difference between the counter value of the state counter 211 and the counter value of the success counter 212 is "0", which is lower than the allowable difference value 213 (e.g. "3"). Then, the boot program starts to execute the current OS program (at a time point "t43"), after increasing the counter value of the state counter 211 by "1" (a time point "t42"). Then, the current OS program increases the counter value of the success counter 212 by "1" (at a time point "t44"), when the execution of the current OS program is terminated properly. As a result, the respective counter values of the state counter 211 and the success counter 212 are the same value when the current OS program is terminated, and this state is maintained even after the current OS program is terminated (at a time point "t45"). Thus, the difference between the respective counter values of the state counter 212 and the success counter 212 does not change in the case that the current OS program runs properly.

On the other hand, in the case that the OS program is updated and does not run properly after the update processing, the respective values of the state counter 211 and the success counter 212 change as shown in FIG. 19. That is, once the OS program is updated, the respective counter values of the state counter 211 and the success counter 212 are reset to "0" (step S69 in FIG. 17). Therefore, when the boot loader program is again executed later, the respective counter values of the state counter 211 and the success counter 212 are "0" (at a time point "t51"). As a result, the boot loader program selects the current OS program (i.e. the updated OS program), since the difference between the counter value of the state counter 211 and the counter value of the success counter 212 is "0", which is lower than the allowable difference value 213. Then, the boot loader program starts to execute the current OS program (at a time point "t53"), after increasing the counter value of the state counter 211 by "1" (at a time point "t52"). Nevertheless, the current OS program does not perform properly and thereby fails to end properly. In this case, the counter value of the success counter 212 does not change since the processing of the step S70 in FIG. 17 is not performed, and especially in this example, the counter value remains in "0". As a result, the difference between the counter value of the state counter 211 and the counter value of the success counter 212 becomes "1" (at a time point "t54").

After that, if the current OS program does not run properly and such a state repeats a few or several times, even though the user again supplies the power to the information processing apparatus to execute the boot loader program again, only the counter value of the state counter 211 increases and thereby the difference between the counter value of the state counter 211 and the counter value of the success counter 212 increases gradually, as shown at time points "t55" and "t56" in FIG. 19. Then, if this difference exceeds the allowable difference value 213, the boot loader program selects and executes the backup OS program or the default OS program instead of the current OS program (see steps S43, S48, S49 and S51 in FIG. 16).

According to the information processing apparatus of the second example having such a construction, a trouble in which the information processing apparatus does not function at all or a trouble in which the majority of the functions of the apparatus is lost can be avoided, by executing the alternative OS program even in the case that one of the OS programs does not run properly.

Particularly, according to the present invention, the execution of the current OS program can be retried in a case that the current OS program does not accidentally end properly, since it is counted how many times the current OS program does not end properly, and the backup OS program or the default OS program is executed instead of the current OS program in a case that the number of times that the current OS program does not end properly reaches a predetermined number of times. Therefore, it is possible to substantially judge a trouble that may arise due to the update processing of the current OS program, and thereby it is possible to enhance performances in a selection, a management and an updating of the OS program.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-012233 filed on Jan. 21, 2003 including the specification, claims, drawings and summary is incorporated herein by reference in its entirety.

What is claimed is:

1. An information processing apparatus comprising:
    a first memory device for storing a first program, the first program including a command to execute other programs and being executed when the information processing apparatus starts;
    a second memory device for storing a second program to perform a predetermined processing in accordance with the command in the first program;
    a third memory device for storing a backup program for the second program;
    a fourth memory device for storing a first state information to substantially indicate that the second program does not properly perform the predetermined processing; and
    a first selection device for selecting either one of the second program and the backup program, as a program to be executed in accordance with the command in the first program, on the basis of the first state information.

2. The information processing apparatus according to claim 1, wherein said first selection device is embodied with a command in the first program.

3. The information processing apparatus according to claim 1, further comprising:
    a first state information set device for setting or changing the first state information to a first content, when the first program executes or executed the second program or the backup program; and
    a second state information set device for setting or changing the first state information to a second content, when the second program or the backup program ends or ended properly.

4. The information processing apparatus according to claim 3, wherein said first state information set device is embodied with a command in the first program.

5. The information processing apparatus according to claim 3, wherein said second state information set device is embodied with a command in the second program or in the backup program.

6. The information processing apparatus according to claim 1, further comprising:
a fifth memory device for storing a default program of the second program;
a sixth memory device for storing a second state information to substantially indicate that the backup program does not properly perform its predetermined processing; and
a second selection device for selecting either one of the backup program and the default program, as a program to be executed in accordance with the command in the first program, on the basis of the second state information.

7. The information processing apparatus according to claim 6, wherein said second selection device is embodied with a command in the first program.

8. The information processing apparatus according to claim 1, further comprising:
an update device for updating the second program; and
a backup device for storing the second program, as the backup program, that is not still updated with said update device, into said third memory device.

9. The information processing apparatus according to claim 8, wherein said update device receives a new second program that is supplied via a communication network, and replaces the existing second program with the new second program.

10. The information processing apparatus according to claim 1, wherein the first state information substantially indicates the number of times that the second program does not properly perform its predetermined processing, and
said first selection device compares the number of times that is indicated by the first state information with a reference numeral, and selects either one of the second program and the backup program, as a program to be executed in accordance with the command in the first program, on the basis of a result of the comparison.

11. The information processing apparatus according to claim 1, further comprising a first notice device for generating a notice information to substantially indicate that the backup program is selected.

12. The information processing apparatus according to claim 6, further comprising a second notice device for generating a notice information to substantially indicate that the default program is selected.

13. The information processing apparatus according to claim 1, wherein the first state information is a flag.

14. The information processing apparatus according to claim 1, wherein the first program includes a boot loader program.

15. The information processing apparatus according to claim 1, wherein the second program includes an operating system program.

16. A computer program product in a computer-readable medium for tangibly embodying a program of instructions executable by a computer to make the computer function as an information processing apparatus, said apparatus comprising:
a first memory device for storing a first program, the first program including a command to execute other programs and being executed when the information processing apparatus starts;
a second memory device for storing a second program to perform a predetermined processing in accordance with the command in the first program;
a third memory device for storing a backup program for the second program;
a fourth memory device for storing a first state information to substantially indicate that the second program does not properly perform the predetermined processing; and
a first selection device for selecting either one of the second program and the backup program, as a program to be executed in accordance with the command in the first program, on the basis of the first state information.

17. An information processing method feasible with an information processing apparatus capable of processing a first program, the first program including a command to execute other programs and being executed when the information processing apparatus starts; a second program to perform a predetermined processing in accordance with the command in the first program; a backup program for the second program; and a first state information to substantially indicate that the second program does not properly perform its predetermined processing,
said method comprising:
a first state information set process of setting or changing the first state information to a first content, when the first program executes or executed the second program or the backup program;
a second state information set process of setting or changing the first state information to a second content, when the second program or the backup program ends or ended properly; and
a selection process of selecting either one of the second program and the backup program, on the basis of the first state information, when the first program executes again the second program or the backup program.

18. The information processing apparatus according to claim 1, wherein said fourth memory device holds the content of the first state information through a restarting process of the information processing apparatus.

* * * * *